(12) United States Patent
Kumar et al.

(10) Patent No.: US 11,921,756 B2
(45) Date of Patent: Mar. 5, 2024

(54) AUTOMATED DATABASE OPERATION CLASSIFICATION USING ARTIFICIAL INTELLIGENCE TECHNIQUES

(71) Applicant: Dell Products L.P., Round Rock, TX (US)

(72) Inventors: Dhilip S. Kumar, Bangalore (IN); Ponnayan Sekar, Bangalore (IN); Hung T. Dinh, Austin, TX (US); Bijan Kumar Mohanty, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/867,164

(22) Filed: Jul. 18, 2022

(65) Prior Publication Data

US 2024/0020320 A1    Jan. 18, 2024

(51) Int. Cl.
*G06F 7/00* (2006.01)
*G06F 16/245* (2019.01)
*G06F 16/28* (2019.01)
*G06N 20/20* (2019.01)

(52) U.S. Cl.
CPC .......... *G06F 16/285* (2019.01); *G06F 16/245* (2019.01); *G06N 20/20* (2019.01)

(58) Field of Classification Search
CPC ...... G06F 16/285; G06F 16/245; G06N 20/00
USPC .......................................... 707/600–899, 737
See application file for complete search history.

(56) References Cited

U.S. PATENT DOCUMENTS

| | | |
|---|---|---|
| 11,269,823 B1 | 3/2022 | Wilton et al. |
| 11,301,930 B1 | 4/2022 | Langley et al. |
| 11,308,047 B2 | 4/2022 | Zhou et al. |
| 2018/0268065 A1* | 9/2018 | Parepally ............... G06N 20/00 |

* cited by examiner

*Primary Examiner* — Isaac M Woo
(74) *Attorney, Agent, or Firm* — Ryan, Mason & Lewis, LLP

(57) ABSTRACT

Methods, apparatus, and processor-readable storage media for automated database operation classification using artificial intelligence techniques are provided herein. An example computer-implemented method includes obtaining at least one query related to one or more database operations; obtaining information pertaining to a set of multiple storage resources; classifying the at least one query as associated with at least one of multiple subsets of storage resources among the set of multiple storage resources by processing at least a portion of the query and at least a portion of the information pertaining to the set of multiple storage resources using one or more artificial intelligence techniques; and performing one or more automated actions based at least in part on the classifying of the at least one query.

20 Claims, 13 Drawing Sheets

FIG. 6

```
import numpy as np
import pandas as pd
from sklearn.model_selection import train_test_split
from sklearn.ensemble import RandomForestClassifier
from sklearn.metrics import accuracy_score
from sklearn.metrics import confusion_matrix
from sklearn.tree import DecisionTreeClassifier
from sklearn.preprocessing import LabelEncoder
from sklearn import tree import warnings filter
from warnings import simplefilter
# ignore all future warnings
simplefilter(action='ignore', category=FutureWarning)
```

```
transaction_data = pd.read_csv("data/database_transaction.csv",sep= ' ', header= None)

X = transaction_data.values[:, 1:6]
Y = transaction_data.values[:, 0]

# Encode the categorical values by using Label Encoding
X = LabelEncoder().fit_transform(X)
Y = LabelEncoder().fit_transform(Y)

# Split the data into training(70%) and testing(30%) sets
X_train, X_test, y_train, y_test = train_test_split(X, Y, test_size = 0.3, random_state = 42)
```

```
# Train model using training data
trained_model = RandomForestClassifier(criterion='entropy')
trained_model.fit(X_train, y_train)

predictions = trained_model.predict(X_test)

# Train and Test Accuracy
print("Train Accuracy :: ", accuracy_score(y_train, trained_model.predict(X_train)))
print("Test Accuracy :: ", accuracy_score(y_test, predictions))
print("Confusion matrix ", confusion_matrix(y_test, predictions))
```

FIG. 10

```
#Import necessary libraries
%matplotlib inline
import pandas as pd
import numpy as np
import matplotlib.pyplot as plt
import seaborn as sns
import tensorflow as tf
print(tf.__version__)
from sklearn import preprocessing import warnings
from sklearn.model_selection import train_test_split
warnings.filterwarnings("ignore")

# reading the historical data file into pandas dataframe
datastorage_df = pd.read_csv("database_storage_class.csv") # Read the historical storage class of the database
```

FIG. 11 — 1100

```
# Encode the categorical values by using Label Encoding
from sklearn.preprocessing import LabelEncoder datastorage_df = LabelEncoder().fit_transform(datastorage_df)
```

FIG. 12 — 1200

```
from sklearn.preprocessing import StandardScaler
scalar = StandardScaler()
datastorage_scaled = pd.DataFrame(scalar.fit_transform(datastorage_df), columns=datastorage_df.columns)

from sklearn.decomposition import PCA datastorage_pca = pd.DataFrame(pca.fit_transform(datastorage_scaled))
```

FIG. 13 — 1300

```
# Split Training and Testing data sets
#First get the independent variables and dependent variable separated
features = [col for col in datastorage_pca.columns if col != 'StorageTier']

x_train, x_test, y_train, y_test = train_test_split(datastorage_pca[features], datastorage_pca['StorageTier'], test_size=.3, random_state=42)
```

FIG. 14

```
Using TensorflowKeras to create the Dense Neural Network model for multi-class Classification from tensorflow.keras import Sequential
from tensorflow.keras.layers import Dense

# Initialize the constructor
model = Sequential()

# Add a first hidden layer for the 19 input variables
model.add(Dense(32, input_shape = (19,), activation='relu', kernel_initializer='normal'))

# second hidden layer
model.add(Dense(16, activation='relu' , kernel_initializer='normal'))

# Add an output layer with four neurons to match the four classes of storage tiers and softmax activation
model.add(Dense(4, activation='softmax'))

# set the loss function and optimizer
model.compile(loss='categorical_crossentropy', optimizer='adam', metrics='accuracy')
```

```
# Train the model with the training data
history = model.fit(X_train, y_train.values, validation_split=0.2,
            epochs=100, batch_size=500, verbose=1)

# Evaluate the loss value of the model using Testing data
loss = model.evaluate(X_test, y_test, verbose=False)

# Predict the expected outcome from the model
y_predict = model.predict(X_test)
```

FIG. 16

1600 — OBTAIN AT LEAST ONE QUERY RELATED TO ONE OR MORE DATABASE OPERATIONS

1602 — OBTAIN INFORMATION PERTAINING TO A SET OF MULTIPLE STORAGE RESOURCES

1604 — CLASSIFY THE AT LEAST ONE QUERY AS ASSOCIATED WITH AT LEAST ONE OF MULTIPLE SUBSETS OF STORAGE RESOURCES AMONG THE SET OF MULTIPLE STORAGE RESOURCES BY PROCESSING AT LEAST A PORTION OF THE QUERY AND AT LEAST A PORTION OF THE INFORMATION PERTAINING TO THE SET OF MULTIPLE STORAGE RESOURCES USING ONE OR MORE ARTIFICIAL INTELLIGENCE TECHNIQUES

1606 — PERFORM ONE OR MORE AUTOMATED ACTIONS BASED AT LEAST IN PART ON THE CLASSIFYING OF THE AT LEAST ONE QUERY

AUTOMATED DATABASE OPERATION CLASSIFICATION USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in connection with such systems.

BACKGROUND

Users and enterprises commonly face challenges in protecting data and enabling access to stored data, and the selection of inappropriate and/or sub-optimal storage solutions often results in exacerbating such challenges and/or creating related issues. For example, conventional storage management techniques include labor-intensive and error-prone processes, which can result in cost increases and temporal delays.

SUMMARY

Illustrative embodiments of the disclosure provide techniques for automated database operation classification using artificial intelligence techniques. An exemplary computer-implemented method includes obtaining at least one query related to one or more database operations, and obtaining information pertaining to a set of multiple storage resources. The method also includes classifying the at least one query as associated with at least one of multiple subsets of storage resources among the set of multiple storage resources by processing at least a portion of the query and at least a portion of the information pertaining to the set of multiple storage resources using one or more artificial intelligence techniques. Further, the method includes performing one or more automated actions based at least in part on the classifying of the at least one query.

Illustrative embodiments can provide significant advantages relative to conventional storage management techniques. For example, problems associated with labor-intensive and error-prone processes are overcome in one or more embodiments through automatically classifying database operations with respect to various storage resources using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 6 shows example pseudocode for importing libraries in an illustrative embodiment.

FIG. 7 shows example pseudocode for encoding and splitting data in an illustrative embodiment.

FIG. 8 shows example pseudocode for training and testing a random forest classifier in an illustrative embodiment.

FIG. 10 shows example pseudocode for data preprocessing in an illustrative embodiment.

FIG. 11 shows example pseudocode for encoding categorical values in an illustrative embodiment.

FIG. 12 shows example pseudocode for reducing dimensionality of a dataset in an illustrative embodiment.

FIG. 13 shows example pseudocode for splitting a dataset for training and testing purposes in an illustrative embodiment.

FIG. 14 shows example pseudocode for creating a neural network model in an illustrative embodiment.

FIG. 15 shows example pseudocode for training, evaluating, and executing a neural network model in an illustrative embodiment.

FIG. 16 is a flow diagram of a process for automated database operation classification using artificial intelligence techniques in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
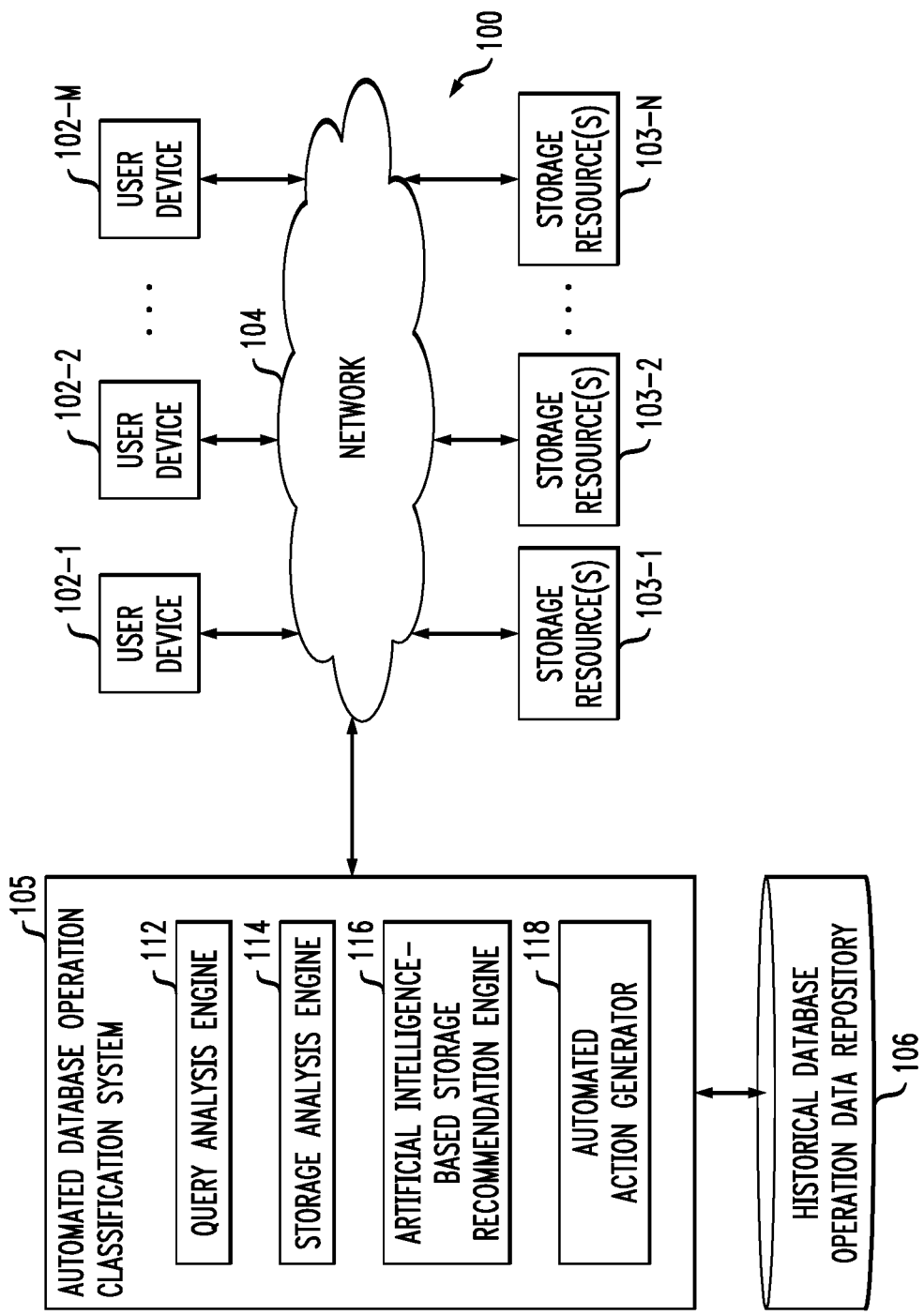
FIG. 1 shows an information processing system configured for automated database operation classification using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102, and a plurality of storage resources 103-1, 103-2, . . . 103-N, collectively referred to herein as storage resources 103. By way merely of example, storage resources 103 can encompass various storage tiers including a less expensive tier (e.g., hard disk drives (HDDs)), a moderately priced tier (e.g., some solid state drives (SSDs)), a higher priced hybrid tier (e.g., SSDs and non-volatile memory express (NVMe)), and a highest priced tier (e.g., some storage using NVMe).

The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated database operation classification system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated database operation classification system 105 can have an associated historical database operation data repository 106 configured to store data pertaining to various database operations carried out in connection with multiple storage resources.

The historical database operation data repository 106 in the present embodiment is implemented using one or more storage systems associated with automated database operation classification system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated database operation classification system 105 are one or more input-output devices, which illustratively comprise keyboards, displays or other types of input-output devices in any combination. Such input-output devices can be used, for example, to support one or more user interfaces to automated database operation classification system 105, as well as to support communication between automated database operation classification system 105 and other related systems and devices not explicitly shown.

Additionally, automated database operation classification system 105 in the FIG. 1 embodiment is assumed to be implemented using at least one processing device. Each such processing device generally comprises at least one processor and an associated memory, and implements one or more functional modules for controlling certain features of automated database operation classification system 105.

More particularly, automated database operation classification system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated database operation classification system 105 to communicate over the network 104 with the user devices 102, and illustratively comprises one or more conventional transceivers.

The automated database operation classification system 105 further comprises query analysis engine 112, storage analysis engine 114, artificial intelligence-based storage recommendation engine 116, and automated action generator 118.

It is to be appreciated that this particular arrangement of elements 112, 114, 116 and 118 illustrated in the automated database operation classification system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automated database operation classification using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated database operation classification system 105 and historical database operation data repository 106 can be on and/or part of the same processing platform.

An exemplary process utilizing elements 112, 114, 116 and 118 of an example automated database operation classification system 105 in computer network 100 will be described in more detail with reference to the flow diagram of FIG. 16.

Accordingly, at least one embodiment includes storage determination techniques that integrate with storage-related information such as, for example, database query requests, response logs, query access paths, and plans. As further detailed herein, such an embodiment includes learning, using one or more artificial intelligence techniques, available storage resources in one or more clusters, and recommending storage for various types of data (e.g., frequently accessed data, less-frequently accessed data, and rarely accessed data).

One or more embodiments include registering metadata pertaining to the type(s) of storage in one or more clusters, and can include information such as storage levels, priority information, etc. Additionally, such an embodiment includes analyzing request queries, response queries, query plans, etc., and measuring and/or determining priority information for corresponding data, and using such determinations in identifying at least one storage solution to recommend. In such an embodiment, at least one machine learning-based algorithm can be trained and implemented to learn the load and/or performance of one or more queries, and predict and/or recommend at least one proper storage solution.

As also described herein, one or more embodiments include determining and/or registering the level (e.g., the granularity) at which at least a portion of the techniques detailed herein are to be configured. By way of example, configuration levels can include table level, schema level, database level, etc.

Additionally, at least one embodiment includes assessing the behavior of one or more users of given items of data. Such assessments can be used, for example, in determining storage recommendations to remove performance bottlenecks (e.g., preemptively remove performance bottlenecks for the one or more users). Such a recommendation (e.g., a proactive recommendation) can, for example, facilitate steering a decision on the choice of the storage of a database that is sufficiently available and optimized for storage from a performance as well cost perspective. One or more embodiments include determining such a recommendation by initially configuring storage clusters and analysis levels with general-purpose and database-specific entities. Over time, data access information is accumulated and/or learned in connection with queries executed and responded to in the database(s) configured therefor.

As further detailed here, at least one embodiment includes determining and/or learning the natural language of one or more given databases (e.g., join, select, where, and/or statements, etc.). Also, the techniques described herein can be implemented and/or executed in a stealth mode while working with database queries and building a data access repository from request queries and response queries of the corresponding database.

Figure 2:
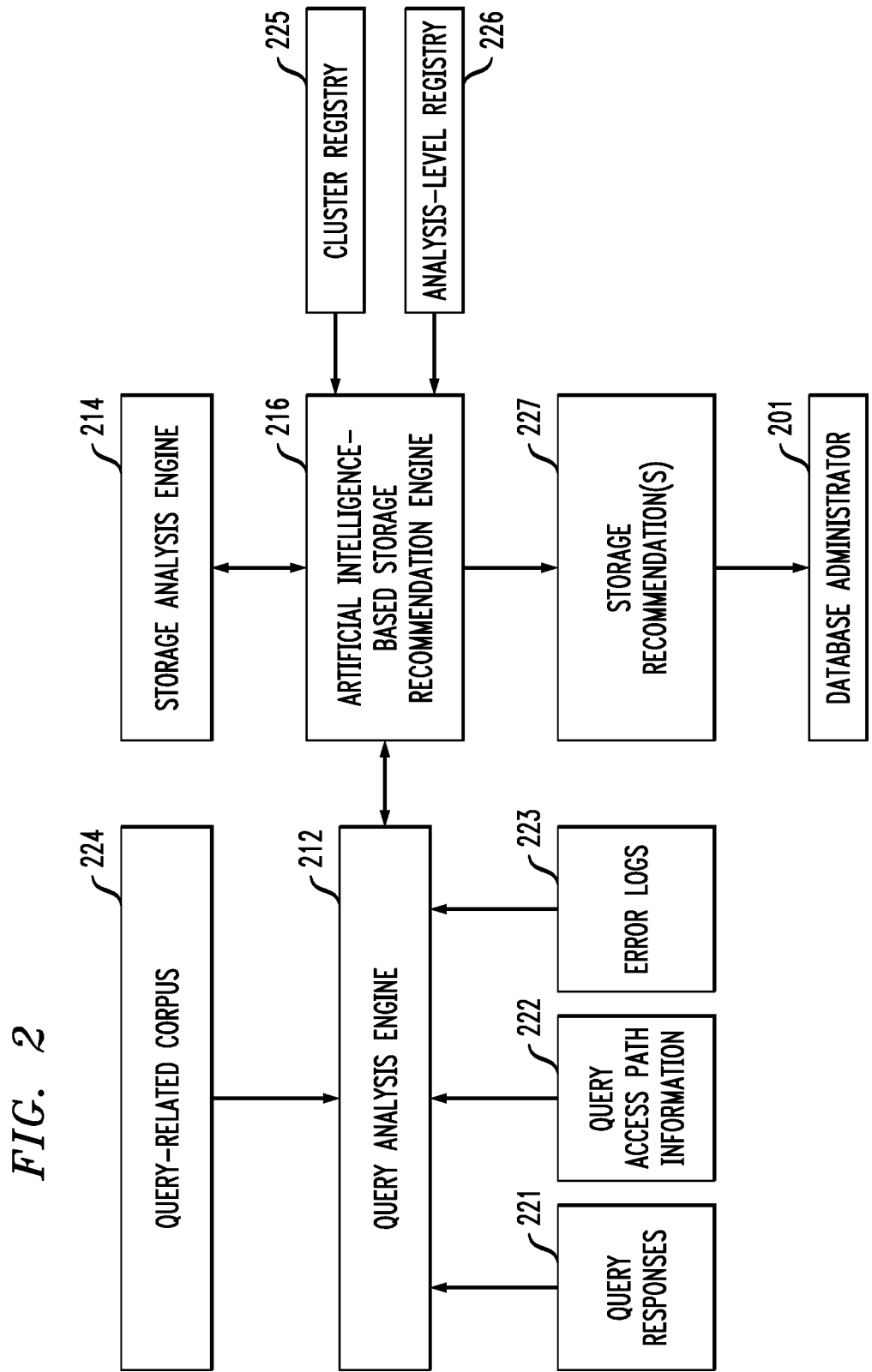
FIG. 2 shows example system architecture in an illustrative embodiment.

FIG. 2 shows example system architecture in an illustrative embodiment. By way of illustration, FIG. 2 depicts query analysis engine 212, which processes and/or interprets query responses 221, query access path information 222, and error logs 223. For example, query access path information 222 can include data read from disks, memory, tablespaces, partition locations (disk locations), data distribution locations (e.g., node identifiers), clusters, etc. In connection with data from query-related corpus 224, such processing by query analysis engine 212 facilitates determination of the performance of one or more queries consecutively (e.g., stating consistent and/or query responses each time). In one or more embodiments, the query-related corpus 224 stores database keywords, ORA files for Oracle errors, SQLERR for structured query language (SQL) errors, NOSQL database information, etc.

FIG. 2 also depicts storage analysis engine 214, which analyzes (e.g., periodically analyzes) storage resources (e.g., storage systems), based at least in part on query analysis, to identify data at rest at improper storage resources. Accordingly, in one or more embodiments, both query analysis (via query analysis engine 212) and storage analysis (via storage analysis engine 214) work through artificial intelligence-based storage recommendation engine 216. As also illustrated in FIG. 2, based at least in part on output from the storage analysis engine 214 and output from the query analysis engine 212, artificial intelligence-based storage recommendation engine 216 generates one or more storage recommendations 227 (e.g., identification of one or more particular storage resources) for one or more storage-related queries. In one or more embodiments, artificial intelligence-based storage recommendation engine 216 also processes inputs from cluster registry 225 and analysis-level registry 226 as part of generating the recommendation(s). In cluster registry 225, storage location information (e.g., IP address information, domain name system (DNS) path information, etc.) can be stored. Additionally, analysis-level registry 226 can store configuration analysis information required for one or more databases, particular schemas in a database, one or more tables in a database, etc.

Further, the one or more storage recommendations 227 generated and output by artificial intelligence-based storage recommendation engine 216 can be provided, for example, via at least one application programming interface, to a database administrator 201 in connection with one or more storage-related actions. Additionally or alternatively, the one or more storage recommendations 227 can be utilized to initiate one or more automated actions (e.g., provisioning storage resources, allocating data to one or more storage resources, etc.).

As also detailed herein, one or more embodiments can include utilizing historical create, read, update, and delete (CRUD) operations data in connection with multiple storage resources (e.g., databases), and extracting at least one multidimensional feature set therefrom to be used as training data for one or more artificial intelligence techniques. Such training enables the one or more artificial intelligence techniques to classify one or more database operations for the appropriate (e.g., optimal) storage resource(s).

By way merely of example, many databases use different categories of storage that are distinguished based at least in part on factors such as cost, speed, etc. As such, one or more embodiments include implementing artificial intelligence techniques (e.g., at least one machine learning-based classifier) to recommend one or more appropriate (e.g., optimal) storage types and/or categories that fit a given database operation. Based on the recommendation, automated and/or manual actions can be initiated pertaining, for example, to hosting a given database on the appropriate storage system(s).

In at least one embodiment, information such as database queries, corresponding metrics (e.g., performance metrics), the type(s) of databases, and the storage class(es) is collected from the historical data access logs and/or audits. Based at least in part on processing such information, feature extraction is carried out which involves identification of one or more features that can influence the outcome of storage operations and, in one or more example embodiments, identification of one or more features that do not influence the outcome of storage operations. In such an example embodiment, unnecessary features can be removed from the data to reduce dimensionality and assist in the performance and accuracy of model training and execution.

Figure 3:
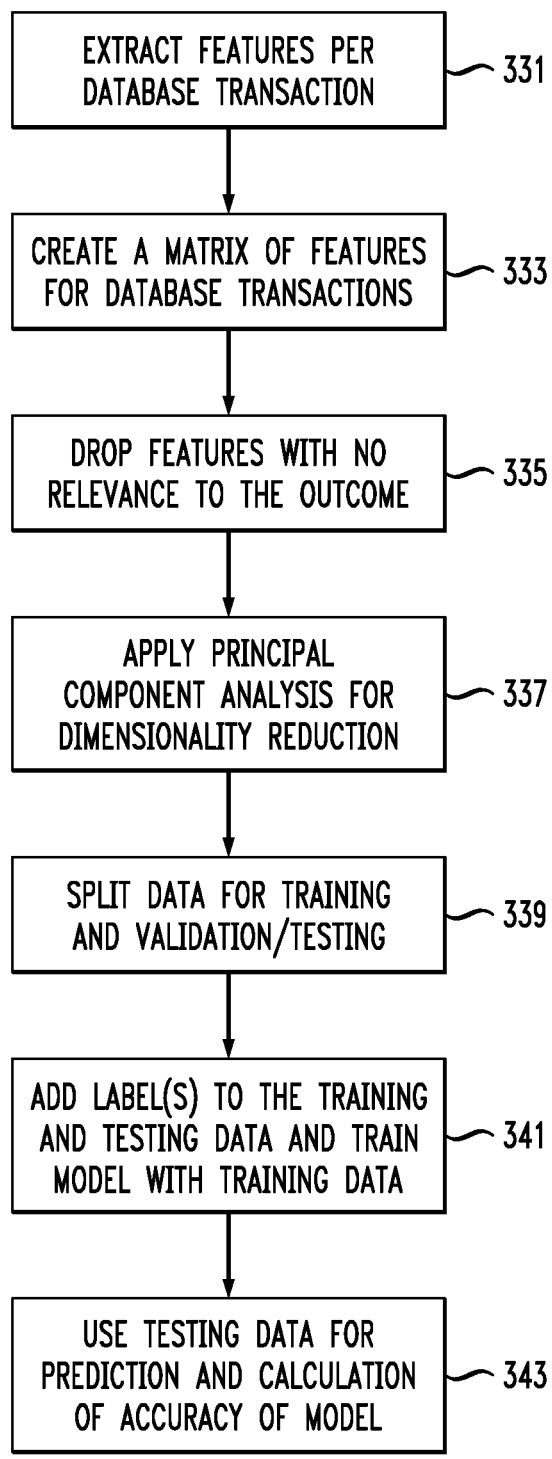
FIG. 3 shows a workflow for training a classification model in an illustrative embodiment.

FIG. 3 shows a workflow for training a classification model in an illustrative embodiment. Specifically, in step 331, database transactions are obtained from one or more databases associated with a given enterprise and one or more features of the transactions (e.g., related to CRUD operations) are extracted per database transaction. In step 333, a matrix of the one or more features for all of the processed database transactions is created. In step 335, any features that lack relevance to at least one influencing variable (with respect to the classification outcome) are deleted. In one or more embodiments, relevance can be computed by creating a heatmap and/or conducting exploratory data analysis such as, for example, bi-variate plot analysis.

In step 337, dimensionality reduction of the dataset is conducted by leveraging principal component analysis (PCA). This helps in reducing the dimensionality of the dataset, thus assisting in improving the performance and accuracy of the model train. Subsequently, in step 339, the remaining data are split into at least one training dataset and at least one testing dataset. In step 341, labels are added to the at least one training dataset and at least one testing dataset, wherein such labels can include, for example, an indication of the type of storage class used, an indication that the data are ready for model training, etc., and the model is trained using the labeled training dataset. Once the model is trained, step 343 includes using the labeled testing dataset for generating at least one prediction (e.g., storage classification) and performing validation by calculating accuracy of the model.

In the feature extraction stage, features extracted from the database transactions can include, for example, transaction type, transaction complexity, cost and/or time taken, memory utilization, central processing unit (CPU) utilization, disk utilization, full table scan or no full table scan, total joins, number of rows accessed, number of rows used, etc.

As further detailed herein, one or more embodiments include leveraging shallow learning techniques and deep learning techniques to build one or more classification models for storage resource predictions. In such an embodiment, shallow learning techniques can be implemented in scenarios of relatively lower data dimensionality and relatively lesser efforts are expected for training a given model. As an example shallow learning option, at least one ensemble bagging technique with a random forest algorithm can be utilized as a multi-class classification approach for predicting the class of storage resource(s) to be used for a given query and/or operation.

In such an embodiment, a random forest algorithm can, as noted, include using "bagging" (also referred to as bootstrap aggregating) to generate predictions. This can include using multiple classifiers (e.g., in parallel), each trained on different data samples and different features, which can reduce the variance and the bias stemming from using a single classifier. In such an embodiment, the final classification is achieved by aggregating the predictions that were made by the different classifiers.

Figure 4:
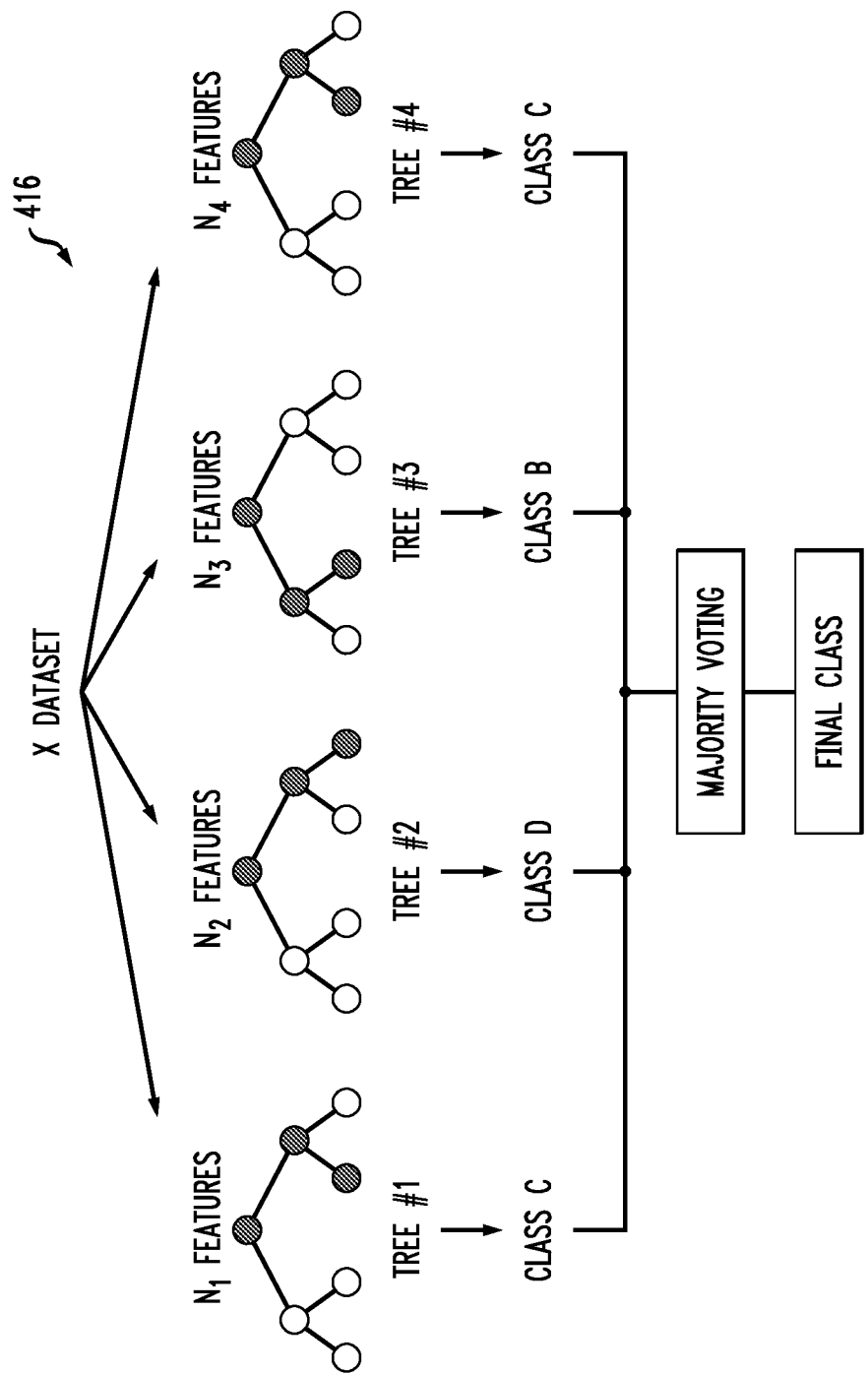
FIG. 4 shows an example random forest classifier structure in an illustrative embodiment.

FIG. 4 shows an example random forest classifier structure in an illustrative embodiment. By way of illustration, FIG. 4 depicts a random forest classifier structure 416 which is composed of a dataset (e.g., X dataset) partitioned into multiple decision trees (e.g., tree #1, tree #2, tree #3 and tree #4), wherein each decision tree is constructed using different features (e.g., $N_1$ features, $N_2$ features, $N_3$ features and $N_4$ features) and different data samples (which can reduce bias and variance), and each decision tree corresponds to at least one of multiple classes (e.g., Class B, Class C and Class D). During the training process, the decision trees are constructed using at least a portion of the given training data (e.g., form X dataset), and in the testing process, each new prediction that needs to be made runs through the different decision trees, wherein each decision tree yields a score and the final prediction in determined by voting (e.g., determining which class got the majority of votes).

In at least one embodiment, a random forest classifier uses multinomial and/or multi-class classification, meaning that the results of the classification can include one of multiple types of classes. In such an embodiment, each class is a storage class and/or tier (e.g., storage tier), such that there are potentially multiple classes and/or tiers, and the model (i.e., classifier) predicts one of the classes and/or tiers along with a confidence score. For such a classification, the multiple independent variables (e.g., X values) can include, for example, the database, transaction(s), transaction complexity, cost and/or latency, CPU, memory utilization, rows accessed, etc., whereas the target variable (e.g., Y value) is the storage class predicted and/or recommended by the model.

Figure 5:
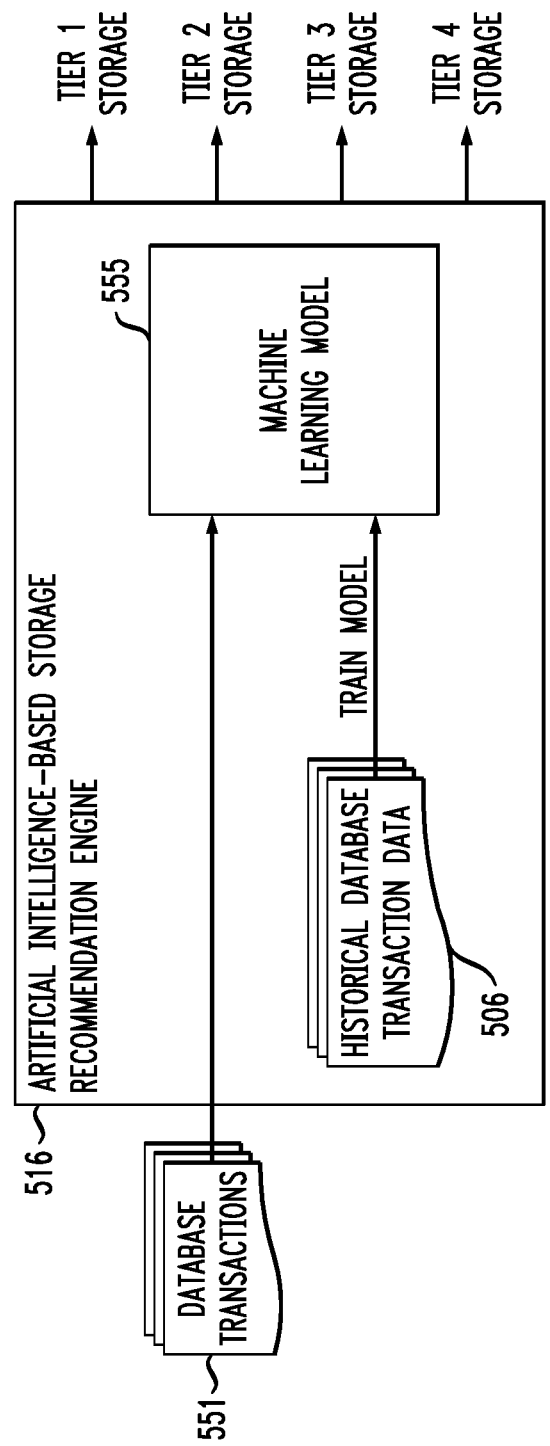
FIG. 5 shows example component architecture of an artificial intelligence-based storage recommendation engine in an illustrative embodiment.

FIG. 5 shows example component architecture of an artificial intelligence-based storage recommendation engine in an illustrative embodiment. By way of illustration, FIG. 5 depicts artificial intelligence-based storage recommendation engine 516, which includes historical database operation data repository 506 and a machine learning model 555 (e.g., a random forest classifier). As illustrated, data from the historical database transaction data repository 506 is used to train the machine learning model 555, and once trained, the machine learning model 555 generates a prediction (e.g., a recommendation of one or more storage resources) in connection with processing information pertaining to one or more database transactions 551. The prediction can include, for example, recommending, for the one or more database transactions 551, the use of one or more of at least one tier 1 storage resource, at least one tier 2 storage resource, at least one tier 3 storage resource, and/or at least one tier 4 storage resource.

Also, one or more embodiments includes implementing a feedback loop for further training the machine learning model 555 based on, for example, user feedback on the prediction and/or recommendation. For example, if the machine learning model 555 predicts a certain tier for the storage of a database given the features provided, and a data architect did not use the predicted storage type (but rather used another type of storage), data pertaining to this selection returns to the model as training data and influences the future predictions of the model.

By way merely of example and illustration, in one or more embodiments, artificial intelligence-based storage recommendation engine 516 can be built using SciKitLearn libraries with Python programming language. Example pseudo-code related to generating and implementing multi-class classification using a random forest classifier to predict and/or recommend storage resources for database operations is detailed further below.

FIG. 6 shows example pseudocode for importing libraries in an illustrative embodiment. In this embodiment, example pseudocode 600 is executed by or under the control of at least one processing system and/or device. For example, the example pseudocode 600 may be viewed as comprising a portion of a software implementation of at least part of automated database operation classification system 105 of the FIG. 1 embodiment.

The example pseudocode 600 illustrates importing the necessary libraries including SciKitLearn, pandas, NumPy, etc., importing a warnings filter and also ignoring future warnings.

It is to be appreciated that this particular example pseudocode shows just one example implementation of importing libraries, and alternative implementations of the process can be used in other embodiments.

FIG. 7 shows example pseudocode for encoding and splitting data in an illustrative embodiment. In this embodiment, example pseudocode 700 is executed by or under the control of at least one processing system and/or device. For example, the example pseudocode 700 may be viewed as comprising a portion of a software implementation of at least part of automated database operation classification system 105 of the FIG. 1 embodiment.

The example pseudocode 700 illustrates reading a database transaction history file to create a training data frame. As illustrated in example pseudocode 700, data are created as a comma-separated values (CSV) file and the data are read to a Pandas data frame. The data are separated into the independent variables and/or features (X) and the dependent variable and/or target value (Y) based on the position of the column in the data frame. The categorical data in both the features and target values are encoded by passing the data to LabelEncoder. Subsequently, the data are split into training and testing sets using the train test split function of the sklearn library. In at least one example embodiment, the training set will contain 70% of the observations (e.g., the input data) while the testing set will contain 30% of the observations.

It is to be appreciated that this particular example pseudocode shows just one example implementation of encoding and splitting data, and alternative implementations of the process can be used in other embodiments.

FIG. 8 shows example pseudocode for training and testing a random forest classifier in an illustrative embodiment. In this embodiment, example pseudocode 800 is executed by or under the control of at least one processing system and/or device. For example, the example pseudocode 800 may be viewed as comprising a portion of a software implementation of at least part of automated database operation classification system 105 of the FIG. 1 embodiment.

The example pseudocode 800 illustrates training a random forest classifier, created using a sklearn library with the criterion hyperparameter as entropy, using training datasets for both independent variables (X_train) and the target variable (y_train). Once trained, the random forest classifier is asked to generate at least one prediction by processing the test data of the independent variable (X_test). Subsequently, the prediction(s), accuracy values and a confusion matrix are printed. In one or more embodiments, hyperparameter tuning can be carried out to improve the accuracy of the random forest classifier.

It is to be appreciated that this particular example pseudocode shows just one example implementation of training and testing a random forest classifier, and alternative implementations of the process can be used in other embodiments.

As also detailed herein, one or more embodiments include implementing deep learning techniques, for example, when there is a relatively large amount of data with a significant amount of dimensionality involved. Such an embodiment can include leveraging at least one multi-layer perception (MLP) and/or at least one artificial neural network as a classifier.

Figure 9:
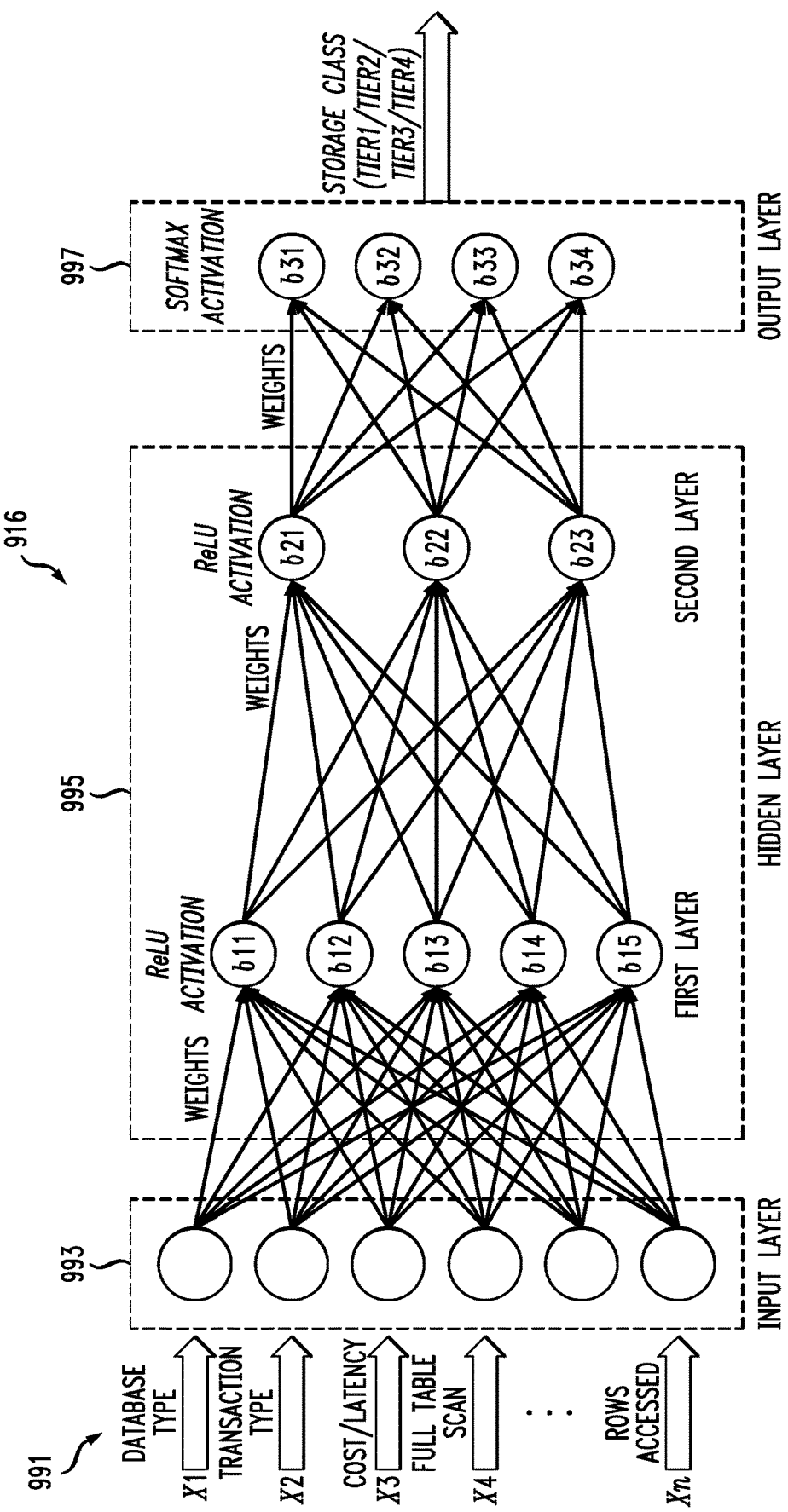
FIG. 9 shows example architecture of a dense artificial neural network-based classifier in an illustrative embodiment.

FIG. 9 shows example architecture of a dense artificial neural network-based classifier in an illustrative embodiment. By way of illustration, FIG. 9 depicts dense artificial neural network-based classifier 916 which functions as a multi-class classifier (e.g., in the example in FIG. 9, there are four classes represented as four tiers of storage). As depicted, dense artificial neural network-based classifier 916 includes an input layer 993, one or more (e.g., two) hidden layers 995 and an output layer 997. Input layer 993, which receives input data 991 pertaining, for example, to database type (X1), transaction type (X2), cost and/or latency (X3), full table scan status (X4), . . . rows accessed (Xn), etc., includes a number of neurons that matches the number of input/independent variables. Hidden layer(s) 995, in the FIG. 9 example, include two layers and the number of neurons on each layer depends at least in part on the number of neurons in the input layer. Output layer 997 contains four neurons to match the number of classes, as the dense artificial neural network-based classifier 916 in the FIG. 9 example is a multi-class classification model.

In the FIG. 9 example, although there are five neurons (e.g., b11, b12, b13, b14 and b15) shown in the first hidden layer of hidden layers 995, and three neurons (e.g., b21, b22 and b23) shown in the second hidden layer of hidden layers 995, such amounts are shown for illustrative purposes and the actual amounts can depend at least in part on the total number of neurons in input layer 993. In one or more embodiments, the number of neurons in the first hidden layer can be calculated using an algorithm of matching the power of two to the number of input nodes. For example, if the number of input variables is 19, it falls in the range of $2^5$. Accordingly, in such an example, the first layer will have $2^5=32$ neurons, the second layer will contain $2^4=16$ neurons, and if there will be a third layer, the third layer would include $2^3=8$ neurons.

As also depicted in FIG. 9, in one or more embodiments, the neurons in the hidden layer(s) 995 and output layer 997 contain at least one activation function which drives if a given neuron will fire or not. In the FIG. 9 example, a rectified linear unit (ReLU) activation function is used in both layers of hidden layers 995, and the output layer 997 uses a softmax activation function.

Considering that dense artificial neural network-based classifier 916 is a dense neural network, each neuron will connect with each other neuron, each connection will have a weight factor, and the neurons will each have a bias factor. These weight and bias values can be set, for example, randomly by the neural network (e.g., such values can be started as 1 or 0 for all values). Also, in one or more embodiments, each neuron performs a linear calculation by combining the multiplication of each input variable ($x_1$, $x_2$ . . . ) with their weight factors (w) and then adding the bias value (b) of the neuron. The formula for this calculation can be shown as follows:

$$ws_1 = x_1 w_1 + x_2 w_2 + \ldots + b_1,$$

wherein $ws_1$ is the weighted sum of the neuron1, $x_1$, $x_2$, etc. are the input values to the neural network, $w_1$, $w_2$, etc. are the weight values applied to the connections to the neuron1, and $b_1$ is the bias value of neuron1. This weighted sum is input to an activation function (e.g., ReLU) to compute the value of the activation function. Similarly, weighted sum and activation function values of all other neurons in the layer (e.g., the first layer of hidden layer(s) 995) are calculated, and these values are fed to the neurons of the next layer (e.g., the second layer of hidden layer(s) 995). The same process is repeated until the values are fed to the neurons of output layer 997 (e.g., neurons b31, b32, b33 and b34), wherein at least one weighted sum is also calculated and compared to at least one actual target value. Depending upon the difference, a loss value can be calculated.

Such a pass-through of dense artificial neural network-based classifier 916 represents a forward propagation which calculates the error and drives a backpropagation through the network to minimize the loss and/or error at each neuron of the network. Considering that the error and/or loss is generated by all neurons in the network, backpropagation goes through each layer, from back to front, and attempts to minimize the error and/or loss by using at least one gradient descent-based optimization mechanism. Considering also that dense artificial neural network-based classifier 916 is used in the FIG. 9 example as a multi-class classifier, one or more embodiments include using "categorical_crossentropy" as the loss function, adaptive moment estimation (ADAM) as the optimization algorithm, and "accuracy" as the metric. Alternatively, at least one embodiment can include utilizing RMSProp as an optimization algorithm.

A result of such backpropagation can include adjusting the weight and/or bias values at each connection and neuron level to reduce the error and/or loss. Additionally, once all observations of the training data are passed through the neural network, an epoch is completed. Another forward propagation can then be initiated with the adjusted weight and bias values, which are considered as epoch2, and the same process of forward and backpropagation is repeated in the subsequent epoch(s). This process of repeating epochs results in the reduction of error and/or loss values to a small number (e.g., close to 0), at which point the neural network is considered to be sufficiently trained for prediction.

The implementation of such a neural network as depicted in the FIG. 9 example can be achieved, for example, by using Keras with TensorFlow backend, Python language, Pandas, NumPy and SciKitLearn libraries, as depicted at least in part in FIG. 10 through FIG. 15.

FIG. 10 shows example pseudocode for data preprocessing in an illustrative embodiment. In this embodiment, example pseudocode 1000 is executed by or under the control of at least one processing system and/or device. For example, the example pseudocode 1000 may be viewed as comprising a portion of a software implementation of at least part of automated database operation classification system 105 of the FIG. 1 embodiment.

The example pseudocode 1000 illustrates reading a dataset of database transaction metrics from an historical data repository and generating a Pandas data frame. Such a data frame can contain columns including independent variables and the dependent/target variable column (e.g., storage tier). Also, example pseudocode 1000 depicts conducting preprocessing of such data to handle any null and/or missing values in the columns, wherein such null and/or missing values in numerical columns can be replaced by the median value of that column. After creating one or more univariate and bivariate plots of the columns, the importance and/or influence of each column can be determined. Columns that have no role or influence on the actual prediction (e.g., the target variable) can be removed.

It is to be appreciated that this particular example pseudocode shows just one example implementation of data preprocessing, and alternative implementations of the process can be used in other embodiments.

FIG. 11 shows example pseudocode for encoding categorical values in an illustrative embodiment. In this embodiment, example pseudocode 1100 is executed by or under the control of at least one processing system and/or device. For example, the example pseudocode 1100 may be viewed as comprising a portion of a software implementation of at least part of automated database operation classification system 105 of the FIG. 1 embodiment.

The example pseudocode 1100 illustrates encoding textual categorical values in columns to numerical values. For example, categorical values associated with database type, transaction type, storage tier, etc. must be encoded to numerical values, and such encoding can be achieved, for example, by using a LabelEncoder function, which is a part of the SciKitLearn library.

It is to be appreciated that this particular example pseudocode shows just one example implementation of encoding categorical values, and alternative implementations of the process can be used in other embodiments.

FIG. 12 shows example pseudocode for reducing dimensionality of a dataset in an illustrative embodiment. In this embodiment, example pseudocode 1200 is executed by or under the control of at least one processing system and/or device. For example, the example pseudocode 1200 may be viewed as comprising a portion of a software implementation of at least part of automated database operation classification system 105 of the FIG. 1 embodiment.

The example pseudocode 1200 illustrates normalizing a dataset by applying scaling techniques and reducing the dimensionality of the normalized dataset by applying PCA techniques. Such scaling techniques can include, for example, using a StandardScaler function available in the SciKitLearn library. Also, in one or more embodiments, subsequent to reducing the dimensionality of the dataset, the dataset can be made ready for model training.

It is to be appreciated that this particular example pseudocode shows just one example implementation of reducing dimensionality of a dataset, and alternative implementations of the process can be used in other embodiments.

FIG. 13 shows example pseudocode for splitting a dataset for training and testing purposes in an illustrative embodiment. In this embodiment, example pseudocode 1300 is executed by or under the control of at least one processing system and/or device. For example, the example pseudocode 1300 may be viewed as comprising a portion of a software implementation of at least part of automated database operation classification system 105 of the FIG. 1 embodiment.

The example pseudocode 1300 illustrates splitting a dataset into a training dataset and a testing dataset using a train test split function of the SciKitLearn library (e.g., with 70% of the dataset being used for training and 30% of the dataset being used for testing).

It is to be appreciated that this particular example pseudocode shows just one example implementation of splitting a dataset for training and testing purposes, and alternative implementations of the process can be used in other embodiments.

FIG. 14 shows example pseudocode for creating a neural network model in an illustrative embodiment. In this embodiment, example pseudocode 1400 is executed by or under the control of at least one processing system and/or device. For example, the example pseudocode 1400 may be viewed as comprising a portion of a software implementation of at least part of automated database operation classification system 105 of the FIG. 1 embodiment.

The example pseudocode 1400 illustrates creating a multi-layer dense neural network using a Keras library to act as a multi-class classifier. Using the function Model( ), the functional model is created, and then individual layers of each branch are added by calling the add( ) function of the model and passing an instance of Dense( ) to indicate that the model is a dense neural network. Accordingly, all neurons in each layer will connect with all neurons from preceding and/or following layers. This Dense( ) function will accept parameters for the number of neurons on the given layer(s), the type(s) of activation function used, and if there are any kernel parameters. Additionally, multiple hidden layers, as well as the output layer, can be added to the model by calling the same add( ) function. Once the model is created, a loss function, an optimizer type and one or more validation metrics are added to the model using a compile( ) function. In one or more embodiments, categorical_crossentropy is used as the loss function, ADAM is used as the optimizer, and accuracy is used as the metric.

It is to be appreciated that this particular example pseudocode shows just one example implementation of creating a neural network model, and alternative implementations of the process can be used in other embodiments.

FIG. 15 shows example pseudocode for training, evaluating, and executing a neural network model in an illustrative embodiment. In this embodiment, example pseudocode 1500 is executed by or under the control of at least one processing system and/or device. For example, the example pseudocode 1500 may be viewed as comprising a portion of a software implementation of at least part of automated database operation classification system 105 of the FIG. 1 embodiment.

The example pseudocode 1500 illustrates neural network model training achieved by calling a fit( ) function and passing training data and the number of epochs. After the model completes the specified number of epochs, the model is considered trained and ready for validation. The loss and/or error value can be obtained by calling an evaluate( ) function and passing testing data. This loss value indicates how well the model is trained, wherein a higher loss value indicates that the model is not sufficiently trained, and hyperparameter tuning may be required. In one or more embodiments, the number of epochs can be increased to further train the model. Other hyperparameter tuning can be carried out, for example, by changing the loss function, the optimizer algorithm, and/or making changes to the neural network architecture by adding one or more hidden layers. Once the model is sufficiently trained (e.g., producing a reasonable value of loss), the model is ready for prediction (e.g., execution). Prediction by the model is achieved by calling a predict( ) function and passing the independent variable(s) of testing data (for comparing training data versus testing data), or actual input values to be used for predicting a storage tier class (e.g., the target variable).

It is to be appreciated that this particular example pseudocode shows just one example implementation of training, evaluating, and executing a neural network model, and alternative implementations of the process can be used in other embodiments.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

FIG. 16 is a flow diagram of a process for automated database operation classification using artificial intelligence techniques in an illustrative embodiment. It is to be understood that this particular process is only an example, and additional or alternative processes can be carried out in other embodiments.

In this embodiment, the process includes steps 1600 through 1606. These steps are assumed to be performed by automated database operation classification system 105 utilizing elements 112, 114, 116 and 118.

Step 1600 includes obtaining at least one query related to one or more database operations.

Step 1602 includes obtaining information pertaining to a set of multiple storage resources. In one or more embodiments, obtaining information pertaining to a set of multiple storage resources includes obtaining one or more of database query request information, response log information, query access path information, and query-related plan information. Additionally or alternatively, obtaining information pertaining to a set of multiple storage resources can include extracting one or more features from the information, and wherein the one or more features comprise at least one feature pertaining to one or more of transaction type, transaction complexity, cost, temporal information, memory utilization, central processing unit utilization, disk utilization, full table scan status, total number of joins, number of rows accessed, and number of rows used.

Step 1604 includes classifying the at least one query as associated with at least one of multiple subsets of storage resources among the set of multiple storage resources by processing at least a portion of the query and at least a portion of the information pertaining to the set of multiple storage resources using one or more artificial intelligence techniques.

In at least one embodiment, processing at least a portion of the query and at least a portion of the information pertaining to the set of multiple storage resources using one or more artificial intelligence techniques includes processing at least a portion of the query and at least a portion of the information pertaining to the set of multiple storage resources using at least one of one or more shallow learning techniques and one or more deep learning techniques. In such an embodiment, processing at least a portion of the query and at least a portion of the information pertaining to the set of multiple storage resources using one or more shallow learning techniques can include using at least one random forest multi-class classifier. Additionally or alternatively, in at least one embodiment, processing at least a portion of the query and at least a portion of the information pertaining to the set of multiple storage resources using one or more deep learning techniques can include using at least one artificial neural network-based classifier.

Step 1606 includes performing one or more automated actions based at least in part on the classifying of the at least one query. In one or more embodiments, performing one or more automated actions includes generating and outputting to at least one database administration system, via at least one application programming interface, at least one recommendation based at least in part on the classifying of the at least one query. Additionally or alternatively, performing one or more automated actions can include automatically initiating one or more actions pertaining to allocating data to one or more storage resources in accordance with the classifying of the at least one query. Also, in at least one embodiment, performing one or more automated actions can include automatically initiating one or more actions pertaining to hosting at least one given database on one or more storage resources in accordance with the classifying of the at least one query. Further, in one or more embodiments, performing one or more automated actions includes automatically training at least a portion of the one or more artificial intelligence techniques using feedback pertaining to results of the classifying of the at least one query.

Accordingly, the particular processing operations and other functionality described in conjunction with the flow diagram of FIG. 16 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically classify database operations with respect to various storage resources using artificial intelligence techniques. These and other embodiments can effectively overcome problems associated with labor-intensive and error-prone processes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 17 and 18. Although described in the context of system 100, these platforms may also be used to implement at least portions of other information processing systems in other embodiments.

Figure 17:
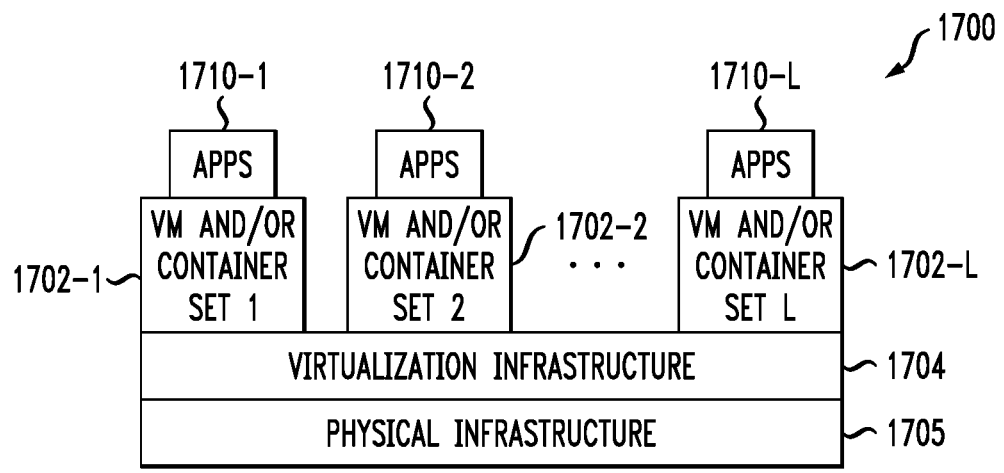
FIGS. 17 and 18 show examples of processing platforms that may be utilized to implement at least a portion of an information processing system in illustrative embodiments.
Figure 18:
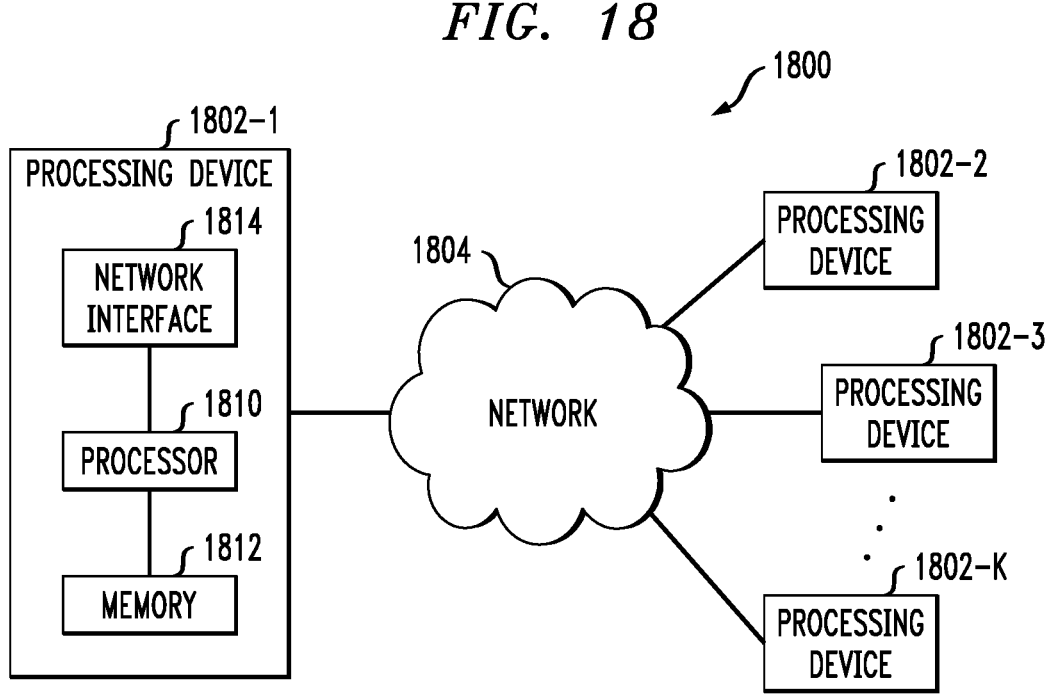

FIG. 17 shows an example processing platform comprising cloud infrastructure 1700. The cloud infrastructure 1700 comprises a combination of physical and virtual processing resources that are utilized to implement at least a portion of the information processing system 100. The cloud infrastructure 1700 comprises multiple virtual machines (VMs) and/or container sets 1702-1, 1702-2, . . . 1702-L implemented using virtualization infrastructure 1704. The virtualization infrastructure 1704 runs on physical infrastructure 1705, and illustratively comprises one or more hypervisors and/or operating system level virtualization infrastructure. The operating system level virtualization infrastructure illustratively comprises kernel control groups of a Linux operating system or other type of operating system.

The cloud infrastructure 1700 further comprises sets of applications 1710-1, 1710-2, . . . 1710-L running on respective ones of the VMs/container sets 1702-1, 1702-2, . . . 1702-L under the control of the virtualization infrastructure 1704. The VMs/container sets 1702 comprise respective VMs, respective sets of one or more containers, or respective sets of one or more containers running in VMs. In some implementations of the FIG. 17 embodiment, the VMs/container sets 1702 comprise respective VMs implemented using virtualization infrastructure 1704 that comprises at least one hypervisor.

A hypervisor platform may be used to implement a hypervisor within the virtualization infrastructure 1704, wherein the hypervisor platform has an associated virtual infrastructure management system. The underlying physical machines comprise one or more information processing platforms that include one or more storage systems.

In other implementations of the FIG. 17 embodiment, the VMs/container sets 1702 comprise respective containers implemented using virtualization infrastructure 1704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . 1802-K, which communicate with one another over a network 1804.

The network 1804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1802-1 in the processing platform 1800 comprises a processor 1810 coupled to a memory 1812.

The processor 1810 comprises a microprocessor, a CPU, a GPU, a TPU, a microcontroller, an ASIC, a FPGA or other type of processing circuitry, as well as portions or combinations of such circuitry elements.

The memory 1812 comprises random access memory (RAM), read-only memory (ROM) or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining at least one query related to one or more database operations;
   obtaining information pertaining to a set of multiple storage resources;
   classifying the at least one query as associated with at least one of multiple subsets of storage resources among the set of multiple storage resources by processing at least a portion of the query and at least a portion of the information pertaining to the set of multiple storage resources using one or more artificial intelligence techniques; and
   performing one or more automated actions based at least in part on the classifying of the at least one query, wherein performing one or more automated actions comprises automatically initiating one or more actions pertaining to allocating data, associated with one or more categories related to access frequency, to one or more storage resources, within the set of multiple storage resources, in accordance with the classifying of the at least one query;
wherein the method is performed by at least one processing device comprising a processor coupled to a memory.

2. The computer-implemented method of claim 1, wherein processing at least a portion of the query and at least a portion of the information pertaining to the set of multiple storage resources using one or more artificial intelligence techniques comprises processing at least a portion of the query and at least a portion of the information pertaining to the set of multiple storage resources using at least one of one or more shallow learning techniques and one or more deep learning techniques.

3. The computer-implemented method of claim 2, wherein processing at least a portion of the query and at least a portion of the information pertaining to the set of multiple storage resources using one or more shallow learning techniques comprises using at least one random forest multi-class classifier.

4. The computer-implemented method of claim 2, wherein processing at least a portion of the query and at least a portion of the information pertaining to the set of multiple storage resources using one or more deep learning techniques comprises using at least one artificial neural network-based classifier.

5. The computer-implemented method of claim 1, wherein performing one or more automated actions comprises generating and outputting to at least one database administration system, via at least one application programming interface, at least one recommendation based at least in part on the classifying of the at least one query.

6. The computer-implemented method of claim 1, wherein performing one or more automated actions comprises automatically initiating one or more actions pertaining to hosting at least one given database on one or more storage resources in accordance with the classifying of the at least one query.

7. The computer-implemented method of claim 1, wherein performing one or more automated actions comprises automatically training at least a portion of the one or more artificial intelligence techniques using feedback pertaining to results of the classifying of the at least one query.

8. The computer-implemented method of claim 1, wherein obtaining information pertaining to a set of multiple storage resources comprises obtaining one or more of database query request information, response log information, query access path information, and query-related plan information.

9. The computer-implemented method of claim 1, wherein obtaining information pertaining to a set of multiple storage resources comprises extracting one or more features from the information, and wherein the one or more features comprise at least one feature pertaining to one or more of transaction type, transaction complexity, cost, temporal information, memory utilization, central processing unit utilization, disk utilization, full table scan status, total number of joins, number of rows accessed, and number of rows used.

10. A non-transitory processor-readable storage medium having stored therein program code of one or more software programs, wherein the program code when executed by at least one processing device causes the at least one processing device:
to obtain at least one query related to one or more database operations;
to obtain information pertaining to a set of multiple storage resources;
to classify the at least one query as associated with at least one of multiple subsets of storage resources among the set of multiple storage resources by processing at least a portion of the query and at least a portion of the information pertaining to the set of multiple storage resources using one or more artificial intelligence techniques; and
to perform one or more automated actions based at least in part on the classifying of the at least one query, wherein performing one or more automated actions comprises automatically initiating one or more actions pertaining to allocating data, associated with one or more categories related to access frequency, to one or more storage resources, within the set of multiple storage resources, in accordance with the classifying of the at least one query.

11. The non-transitory processor-readable storage medium of claim 10, wherein processing at least a portion of the query and at least a portion of the information pertaining to the set of multiple storage resources using one or more artificial intelligence techniques comprises processing at least a portion of the query and at least a portion of the information pertaining to the set of multiple storage resources using at least one of one or more shallow learning techniques and one or more deep learning techniques.

12. The non-transitory processor-readable storage medium of claim 11, wherein processing at least a portion of the query and at least a portion of the information pertaining to the set of multiple storage resources using one or more shallow learning techniques comprises using at least one random forest multi-class classifier.

13. The non-transitory processor-readable storage medium of claim 11, wherein processing at least a portion of the query and at least a portion of the information pertaining to the set of multiple storage resources using one or more deep learning techniques comprises using at least one artificial neural network-based classifier.

14. The non-transitory processor-readable storage medium of claim 10, wherein performing one or more automated actions comprises generating and outputting to at least one database administration system, via at least one application programming interface, at least one recommendation based at least in part on the classifying of the at least one query.

15. An apparatus comprising:
at least one processing device comprising a processor coupled to a memory;
the at least one processing device being configured:
to obtain at least one query related to one or more database operations;
to obtain information pertaining to a set of multiple storage resources;
to classify the at least one query as associated with at least one of multiple subsets of storage resources among the set of multiple storage resources by processing at least a portion of the query and at least a portion of the information pertaining to the set of multiple storage resources using one or more artificial intelligence techniques; and
to perform one or more automated actions based at least in part on the classifying of the at least one query, wherein performing one or more automated actions comprises automatically initiating one or more actions pertaining to allocating data, associated with one or more categories related to access frequency, to one or more storage resources, within the set of multiple storage resources, in accordance with the classifying of the at least one query.

16. The apparatus of claim 15, wherein processing at least a portion of the query and at least a portion of the information pertaining to the set of multiple storage resources using one or more artificial intelligence techniques comprises processing at least a portion of the query and at least a portion of the information pertaining to the set of multiple storage resources using at least one of one or more shallow learning techniques and one or more deep learning techniques.

17. The apparatus of claim 16, wherein processing at least a portion of the query and at least a portion of the information pertaining to the set of multiple storage resources using one or more shallow learning techniques comprises using at least one random forest multi-class classifier.

18. The apparatus of claim 16, wherein processing at least a portion of the query and at least a portion of the information pertaining to the set of multiple storage resources using one or more deep learning techniques comprises using at least one artificial neural network-based classifier.

19. The apparatus of claim 15, wherein performing one or more automated actions comprises generating and outputting to at least one database administration system, via at least one application programming interface, at least one recommendation based at least in part on the classifying of the at least one query.

20. The apparatus of claim 15, wherein performing one or more automated actions comprises automatically initiating one or more actions pertaining to hosting at least one given database on one or more storage resources in accordance with the classifying of the at least one query.

* * * * *